June 7, 1927.
K. SCHERDEL
1,631,697
FRANKFURTER ROLL FORMING MACHINE
Filed July 14, 1926
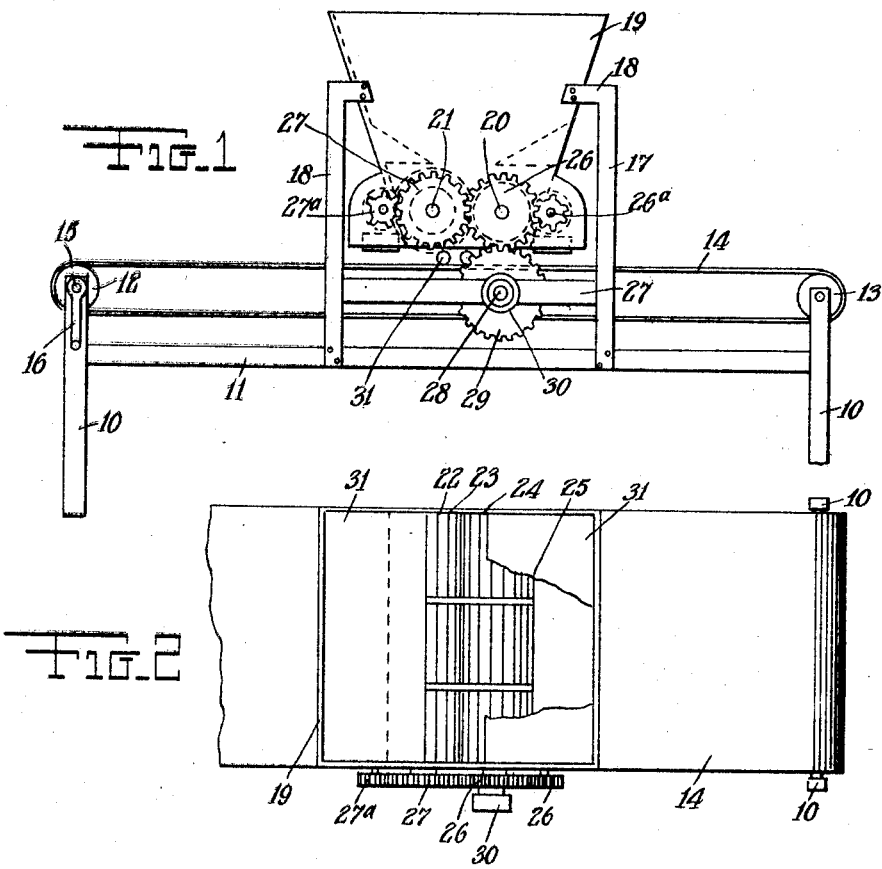
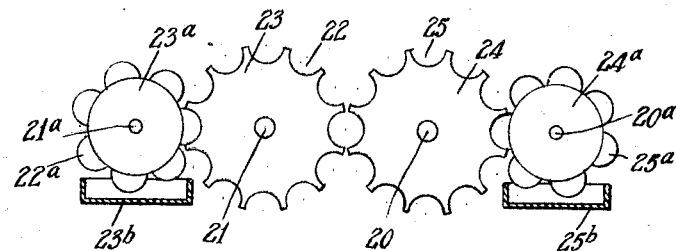
INVENTOR
*K. Scherdel*
BY
ATTORNEY Patented June 7, 1927.

1,631,697

UNITED STATES PATENT OFFICE.

KARL SCHERDEL, OF FITCHBURG, MASSACHUSETTS.

FRANKFURTER-ROLL-FORMING MACHINE.

Application filed July 14, 1926. Serial No. 122,331.

The main object of this invention is to provide a machine for forming rolls, such as are used for frankfurters, in a quick manner. The invention consists of a dough trough or hopper open at the top and is provided with cylinders which form the dough into longitudinal ribbons and means for dividing these ribbons transversely to form a plurality of rolls at rotation of the cylinders.

Another object of this invention is to provide a machine for forming rolls having roll forming cylinders with grooves therein and cooperating cylinders provided with pads which are greased by being precipitated into tanks or containers of melted lard, these pads being rotated synchronously with their complemental roll forming cylinders and used to grease the surfaces of the grooves so that the dough may freely fall from the grooves after being formed.

The above and other objects of the invention will become apparent in the description below, in which characters of reference refer to like-named parts in the drawing.

Referring briefly to the drawing, Figure 1 is a side elevational view of the roll forming means.

Figure 2 is a fragmentary top plan elevational view of Figure 1, showing the arrangement of the dividing cylinders.

Figure 3 is a sectional elevational view, showing the cooperation of the dividing cylinders.

Referring in detail to the drawing, the numeral 10 indicates legs of a frame upon which the entire device is supported. These legs are connected by bars 11 to form a substantially rigid frame. The legs support rollers 12 and 13 around which an endless belt 14 is trained. The shaft 15 of one of the rollers has a crank 16 secured thereto by which the belt 14 is moved. The lower ends of uprights 17 and 18 are secured to the side bars 11 of the frame and extend vertically upward. Right angled extensions 18 at the upper ends of these uprights extend toward each other and support a dough trough 19 fashioned similar to a hopper with diverging walls. At the lower end of the hopper, a pair of shafts 20 and 21 are rotatably mounted. These shafts extend from one side wall to the other. The cylinder 23 is provided with spaced-apart semi-cylindrical grooves 22. These grooves are arranged end to end longitudinally, three in number, 36 to the cylinder. The opposite roller 24 is provided with similar semi-cylindrical grooves 25 aligned with the grooves of the opposing roller to form a cylindrical volume into which the dough is pressed. The shafts 20 and 21 are driven by intermeshing gears 26 and 27 respectively. Between the uprights 17 and 18, a bar 27 is suspended. This bar journals a stud 28 upon which a gear 29 is mounted, the latter meshing with the gear 26 above it. The stud 28 has a pulley 30 attached thereto by which the gears 29, 26, and 27 are rotated thru a source of power not shown. Half the area of the cylinders 23 and 24, when viewed from the top of the trough are covered by wedge-shaped blocks 31. Said blocks have an inclined upper surface which guides the dough in the trough toward the space formed in the cylinders 23 and 24. Adjacent the shafts 20 and 21 on the same horizontal plane, spindles $20^a$ and $21^a$ are journalled in the frame of the hopper 19 at the lower end of the latter. Mounted rigidly on these spindles 20 and $21^a$ are cylinders $23^a$ and $24^a$, solid in cross section, which are provided with radially spaced-apart semi-cylndrical pads $22^a$ and $25^a$, which enter into the grooves 22 or 25 of their complemental cylinders and are adapted to contact with every portion of the surface of these grooves. Beneath the cylinder $23^a$, a pan $23^b$ is mounted in such position that the semi-cylindrical rubber pads $22^a$ in describing their circle when the cylinder $23^a$ rotates, pass into the confines of the pan. This pan is normally filled with melted lard or oil and greases the surfaces of the rubber pads $22^a$. A similar pan $25^b$ is mounted in exactly the same way beneath the cylinder $24^a$ for the purpose of covering the surfaces of the rubber pads $25^a$ with the lard or oil. The spindle $21^a$ is provided with a pinion $27^a$ which meshes with the gear wheel 27 and the opposite spindle $20^a$ is provided with a similar pinion $26^a$, the latter meshing with the gear wheel 26.

In using the machine, leavened dough is filled into the trough 19, and thru a board or the like, gentle pressure is exerted on the top of the dough. The dough is squeezed down upon the cylinders 23 and 24 and the semi-cylindrical grooves 22 in the cylinders are filled with dough. As the semi-cylindrical groove 22 in the cylinder 23 arrives at the horizontal center, the corresponding groove 25 on the opposite cylinder 24 arrives at the same instant on the horizontal center. This forms a complete circle filled with dough and the surfaces of the dough cling together upon contact and form a cylindrical ribbon of dough which provides a frankfurter roll. Further rotation of the cylinders thru the gearing causes the dough in the grooves to drop from the latter in predetermined lengths upon an endless belt 14. As these ribbons of dough fall after passing the horizontal center, they rest upon an endless belt 14, as illustrated by the numeral 31. This endless belt is rotated simultaneously and independently of the gear rotating mechanism and the rolls indicated by the numeral 31 are delivered to either of the ends of the belt, at which position they may be removed and deposited in baking pans. In order to prevent the dough from being retained either of the grooves 22 or 25 as these grooves have passed the horizontal center line, which would commonly occur were no preventive means provided, an oil or lard is used. The oil or lard is contained in the chambers of pans 23$^b$ and 25$^b$. Above these pans, the cylinders 23$^a$ and 24$^a$ are rotatably positioned and these cylinders are so timed to cause the semi-cylindrical soft rubber pads 22$^a$ and 25$^a$ to enter into the grooves of their complemental cylinders 23 and 24 and contact with every portion of the surface forming these grooves. Before these rubber pads contact with the surfaces of these grooves, they first pass into the confines of the grease pans and have their surfaces treated with the contained liquid, the rubber pads dipping into the liquid in describing a circular path across and over the pans.

It is to be noted that certain changes in form and construction may be made without departing from the spirit and scope of the invention

I claim:—

1. A roll forming machine comprising a frame, a trough supported above said frame, said trough being adapted to be filled with dough, means for forming said dough into cylindrical portions of predetermined length comprising cylinders rotatable in the bottom of said trough, semi-cylindrical grooves formed peripherally on said cylinders, and rotating means provided with semi-cylindrical peripheral projections adapted to enter said grooves to lubricate the latter.

2. A roll forming machine comprising a frame, a trough supported above said frame, said trough being adapted to be filled with dough, means for forming said dough into cylindrical portions of predetermined length comprising cylinders rotatable in the bottom of said trough, semi-cylindrical grooves formed peripherally on said cylinders, means for coating said grooves successively with grease comprising cylinders complemental to the roll forming cylinders, means for rotating said second-named cylinders synchronously with the first-named cylinders, and pads on the complemental cylinders entering into the grooves of the first-named cylinders successively for lubricating the surfaces of said grooves.

In testimony whereof I affix my signature.

KARL SCHERDEL.